United States Patent [19]

Heimberger

[11] 4,330,244
[45] May 18, 1982

[54] APPARATUS FOR PRODUCING COUPLING ELEMENTS FOR SLIDE-FASTENER STRINGER

[75] Inventor: Helmut Heimberger, Steinhausen, Switzerland

[73] Assignee: Optilon W. Erich Heilmann GmbH, Cham, Switzerland

[21] Appl. No.: 207,077

[22] Filed: Nov. 14, 1980

[30] Foreign Application Priority Data

Nov. 16, 1979 [DE] Fed. Rep. of Germany ....... 2946228

[51] Int. Cl.³ .............................................. B29D 5/00
[52] U.S. Cl. .................................. 425/115; 264/252; 425/545; 425/814
[58] Field of Search ............... 264/252, 166; 425/545, 425/115, 121, 122, DIG. 34, 814

[56] References Cited

U.S. PATENT DOCUMENTS 2,511,402  6/1950  Firing .................................. 425/545
4,096,225  6/1978  Kowalski ............................ 264/167
4,176,149 11/1979  Moertel .............................. 264/166
4,268,474  5/1981  Moertel .............................. 264/252

Primary Examiner—James B. Lowe
Attorney, Agent, or Firm—Karl F. Ross

[57] ABSTRACT

An apparatus for forming coupling members of synthetic resin for application to a support tape in the production of a slide-fastener stringer comprises a forming wheel to which an endless band is fed to form mold cavities on the periphery of the wheel which are filled with synthetic resin. According to the invention, a further band is fed to overlie the first band and define undercut portions of the cavity to produce projections in the molded members which can engage when the latter are applied to a support tape. A continuous core can be fed to the drum periphery to be embedded in the coupling members as they are formed so that the row of coupling members is produced as a succession of teeth on this continuous element.

4 Claims, 8 Drawing Figures

APPARATUS FOR PRODUCING COUPLING ELEMENTS FOR SLIDE-FASTENER STRINGER

FIELD OF THE INVENTION

My present invention relates to an apparatus for producing coupling elements, i.e. rows of interconnected coupling members or teeth, for incorporation in slide fasteners. More particularly, the invention relates to molded coupling members which generally are composed of a thermoplastic synthetic resin.

BACKGROUND OF THE INVENTION

Slide-fastener stringers generally comprise a pair of slide fastener or stringer halves, each of which is formed with a flexible support tape, e.g. of fabric, along a coupling edge over which is provided a row of coupling members, teeth or heads adapted to interdigitate with the coupling members of an opposing row upon movement or a slider along the stringer.

While the row of coupling members can be formed from a continuous thermoplastic strand in the form of a coil or a meander, or even may be molded in a bar shape with a multiplicity of protuberances forming the spaced-apart heads, the row of coupling members can be provided as discrete molded thermoplastic members in a given equispaced relationship.

These members can be individually clamped and preferably thermally bonded to the support tape, or can be provided in the form of a coupling element which can consist of the row of coupling members molded onto and thereby affixed to a core or cord of thermoplastic or textile material which can extend along the strand and which can be engaged in a weave or net of the fabric tape to mount the coupling members along the edge. In such cases, as well the coupling members may be bonded to the tape and may lie on one side thereof or may straddle the edge of the tape.

Such coupling elements can be produced in a continuous manner and incorporated in the slide-fastener stringer substantially continuously so that the stringer is produced in a continuous manner and lengths can be cut therefrom to form the usual slide fasteners.

Sliders can be applied to the slide-fastener and are adapted to ride along the rows of coupling members, being guided by flanks or formations thereof, while endstop members can be provided individually at each end of each row or to both rows, depending upon whether the slide fastener is of the separable or nonseparable type. In use, the tape of each slide-fastener half is affixed, e.g. by stitching, to one side of an opening in an article which can be closed by movement of the slider.

It is known to form substantially continuous rows of coupling members by molding them from thermoplastic synthetic resin onto textile strands such as the cords or cores mentioned previously with a forming wheel whose periphery is provided with form beds or cavities into which the synthetic resin material is injected or extruded through openings in a continuous band which is fed to the periphery of the wheel and lies thereagainst during the introduction of the synthetic resin and the cooling or setting thereof. The band can then be drawn away from the periphery of the wheel to extract the row of coupling members from the mold cavities and enable this row to be separated, in turn, from the wheel.

A synthetic resin extruder, usually of the worm type, has an outlet, mouth or nozzle which presses against this latter band to force the synthetic resin material through the successive openings thereof into the underlying mold cavities.

One or more textile strands, cores or cords can be fed to the mold cavities between the wheel and the band, either of which can have formations receiving this strand to enable the connecting members to be molded around the strand.

The coupling members can be applied directly to the support tape or can be subjected to further shaping, i.e. bending around the edge of the tape, and are free from projections on the side of each coupling member confronting the tape and from undercuts.

Such projections or undercuts are desirable for a number of reasons. For example, the projections can pass through openings in the tape for engagement with an opposite shank and/or for stable positioning of the coupling members on the tape. When single shank coupling members are provided, these projections may merely fit into gaps in a tape for stable positioning whereas they may also be bonded to yarns of the tape if this mode of attachment is desired. The properties and undercuts can guide a slider.

When they are constructed as double-shank members, the bight from which the two shanks extend to straddle the edge of the tape, forms the coupling head.

Thus it has been recognized heretofore that it is desirable to provide projections, undercuts or other formations on the coupling member in the region of the tape so as to establish a form-locking or form-fitting connection therewith.

In earlier systems, these formations were produced by subjecting the coupling members, usually after withdrawal from the wheel, to deformation treatment. The products molded in the cavities on the wheel, therefore, can be intermediates in the production of the final coupling shape.

With double-strand coupling members, two spaced-apart parallel core strands can be employed so that the coupling members, before being bent to straddle the edge of the tape, constitute "rungs" of the "ladder" formed by the row.

Naturally, when the band with preshaped openings is fed to the periphery of the forming wheel which has correspondingly spaced mold cavities, the operation of these elements must be synchronized so that each mold cavity registers with a respective opening.

A system of the type described having molding beds or cavities in the forming wheel and openings in the forming band, which completely define the shape of the coupling members or intermediates, is disclosed in German patent document (Open Application-Offenlegungsschrift) DE-OS No. 25 37 059. Neither the finished coupling members nor intermediates (which require further forming such as bending to straddle the tape) can be provided with protuberances, ridges or projections which can overhang the slide fastener plane or can be associated with undercuts, can be provided without additional forming steps upon removal of the members from the mold cavities. Such formations are desirable, especially in the case of single-shank coupling members, to form guide surfaces for the slider.

The term "shank" is used to distinguish between the edge of the tape and is shaped to form the coupling head, and the portion which extends away from the head and serves to secure the coupling member to the tape. This latter portion is turned away from the head and is generally elongated.

OBJECTS OF THE INVENTION

It is the principal object of the present invention to provide an apparatus for making single-shank or double-shank coupling members of the type described which can provide guide formations and/or projections, especially formations or projections which can overhang the slide fastener plane or recesses, grooves and the like (undercuts) lying in the slide fastener plane, e.g. for guiding a slider, in a single molding operation.

Another object of the invention is to provide an apparatus for producing improved coupling members in a single step.

SUMMARY OF THE INVENTION

These objects and others which will become apparent hereinafter are attained, in accordance with the present invention, in the making coupling members with a form wheel provided along its periphery with a multiplicity of equispaced mold cavities, and an endless form band having corresponding openings and fed to the periphery of the wheel for feeding synthetic resin material, preferably a thermoplastic, into the mold cavities through these openings.

According to the method aspect of the invention, an additional undercut-forming band, which is also continuous, is fed around the periphery of the wheel and has at least portions which project into the mold cavity to define undercut regions thereof. According to the invention, this additional band is fed between the form band and the wheel periphery and is guided in or lies in a circumferential channel formed in the periphery of the wheel.

When the members of a coupling row are stripped from the mold cavities, therefore, undercut regions will be provided in these members.

According to an apparatus aspect of the invention, the additional undercut-forming band is circulated wholly within the region surrounded by the forming band. It has been found to be advantageous, moreover, to prevent different coefficients of thermal expansion and contraction from affecting the mutual positioning of the two bands by constituting both of them of the same material. The undercutting band can be provided with edge portions or the like for profiling the undercuts.

BRIEF DESCRIPTION OF THE DRAWING

The above and other objects features and advantages of the present invention will become more readily apparent from the following description, reference being made to the accompanying drawing in which.

SPECIFIC DESCRIPTION

Figure 8:
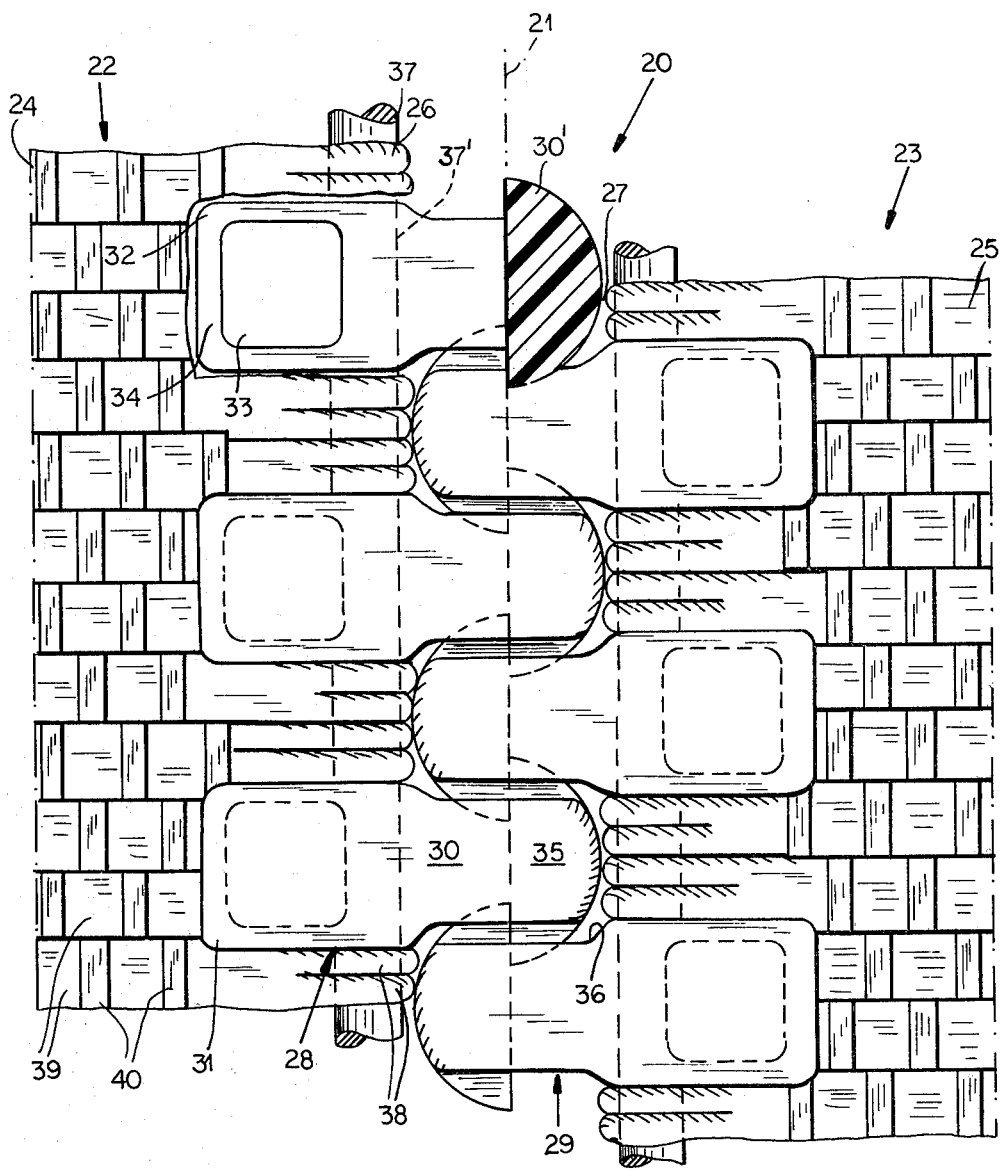
FIG. 8 is a plane view showing a portion of a slide-fastener stringer utilizing rows of coupling members as made by the device of FIG. 2.

In FIG. 8 I have shown a portion of a slide-fastener stringer 20 having a longitudinal slide-fastener axis 21 and a pair of stringer halves 22 and 23 comprising woven fabric tapes 24 and 25 each of which carries on an edge 26, 27 juxtaposed with the other tape, a respective row of 28, 29 of coupling members.

Each row of coupling members 28, 29, comprises a plurality of equispaced coupling members 30 here shown to be of the double-shank type (see FIGS. 4 and 7) with shanks 31 and 32 which respectively overlie and underlie the tapes, the upper shank being broken away for the coupling member 30' so that the lower shank is visible. The confronting faces of the two shanks are formed with projections 33 which can abut one another as illustrated in FIG. 7 so that undercuts 34 are provided in the manner to be described.

The shanks are unitary with coupling heads 35 which in the position shown in FIG. 8, are interdigitated, i.e. each head of one row fits between a pair of heads of the opposite row and is snugly received in the interstices therebetween and represented at 36.

Figure 4:
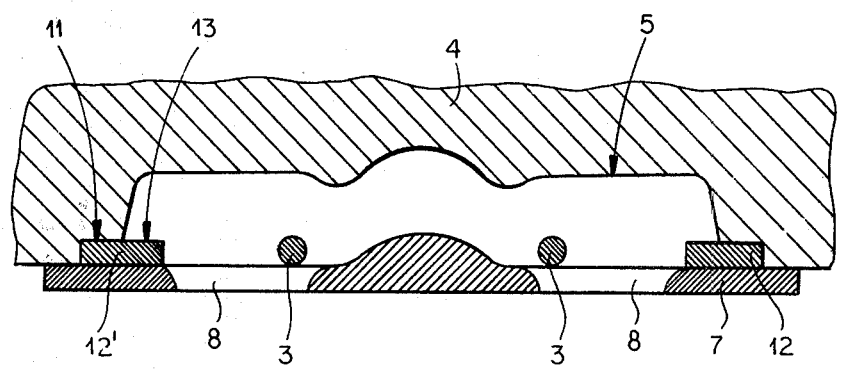
FIG. 4 is another section similar to FIG. 2 for the production of so-called double-shank coupling members.
Figure 7:
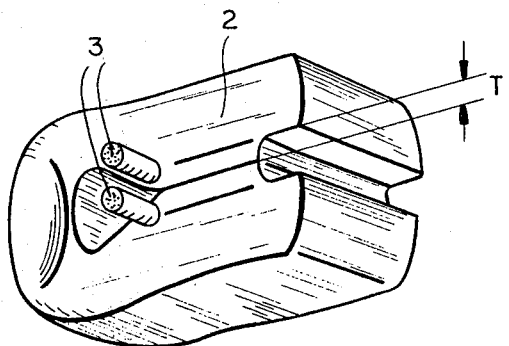
FIG. 7 is a perspective view of a double-shank coupling member showing the relationship of the parts thereof when the two shanks extend codirectionally from the head, e.g. as these shanks appear when the coupling member is applied to a support tape.

In the double-shank arrangement of FIG. 8, the coupling members are molded onto a pair of textile strands or cords 37 and 37' corresponding to the cords 3 shown in FIGS. 4 and 7. These cords are engaged by weft loops 38 of the fabric tapes which are formed by weave weft yarns 39 together with warp yarns 40. The section through the coupling member 30' is taken in the slide fastener plane which corresponds to the plane of the fabric tape and the median plane through the coupling members parallel to the plane of the paper in FIG. 8.

The method and apparatus to be described below form rows of coupling members for use in a slide fastener of this type.

Figure 1:
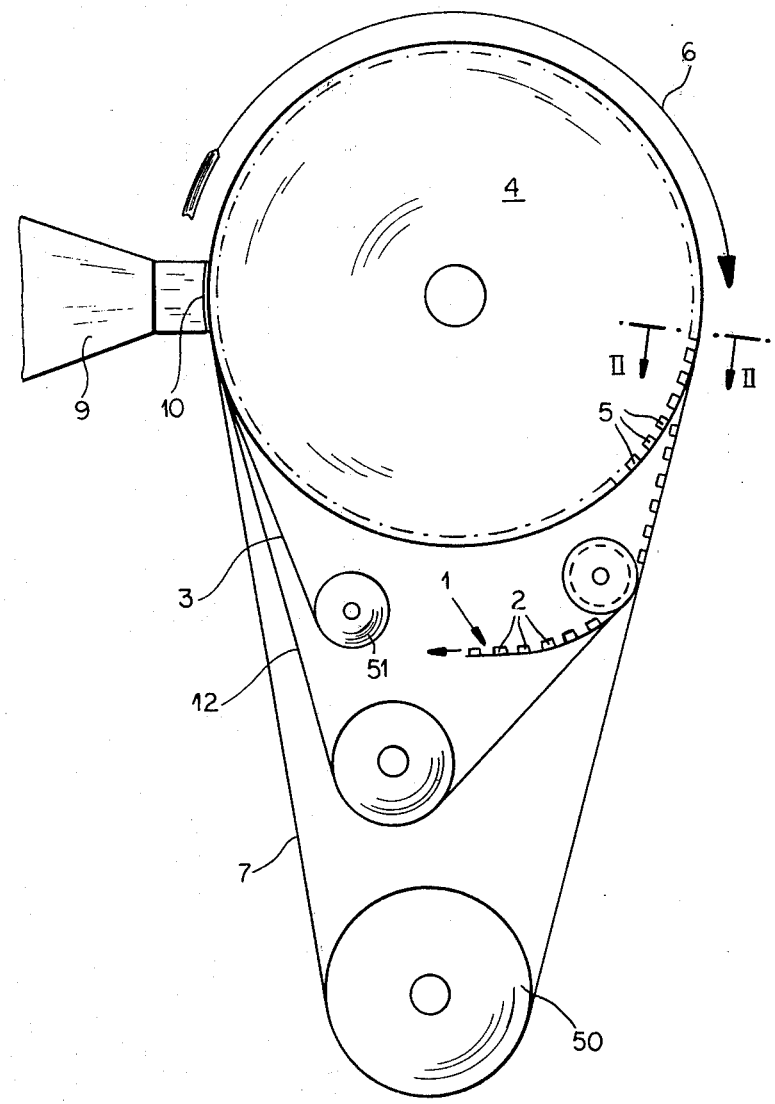
FIG. 1 is a side-elevational view diagrammatically illustrating an apparatus for carrying out the method of the present invention.

The apparatus shown in the drawing (FIG. 1) produces rows 1 of coupling members 2 which have here been illustrated highly diagrammatically, the coupling members being composed of thermoplastic synthetic resin and being mounted in equispaced relationship upon the textile core or strand 3 by means of which the row of coupling members is secured to a respective tape. The core or strand 3 is embedded in the shanks of the coupling members and, where the coupling members have two shanks, at least two such core strands are provided (FIGS. 4 and 7).

The apparatus comprises a continuously rotating forming wheel 4 provided along its periphery with beds or mold cavities 5 and a forming band 7 which passes around an idler roller 50, lies tangent to the wheel 4 between this roller and the wheel and extends around the periphery of the wheel. The region in which this band is looped around the periphery of the wheel is represented at 6. The forming band 7 is provided with openings 8 designed to impart a desired shape to the coupling members, e.g. to form bevels on the projections 33 previously mentioned.

Figure 2:
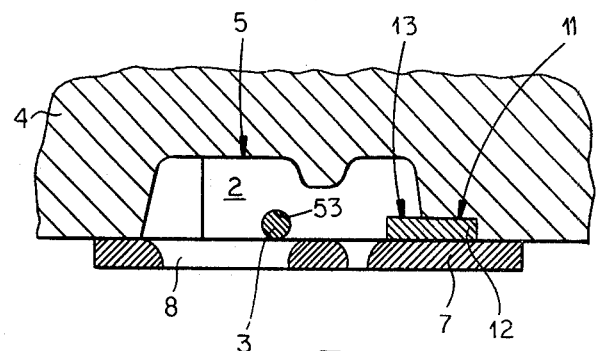
FIG. 2 is a cross-sectional view taken along line II—II of FIG. 1 but drawn to a greatly increased scale.

Along the path 6 the mold cavities 5 with the respective openings 8 registering therewith, are aligned with the nozzle, mouth or outlet of an extrusion press 9 which feeds the thermoplastic synthetic resin in a hot plastified form into the mold cavity to produce a coupling member of corresponding shape, the textile strand (or strands in the case of embodiment of FIGS. 4 and 7) can be fed from a spool 51 and laid into grooves 53 shown, for example, in FIG. 2 so that these strands are disposed in the mold cavities. The thermoplastic synthetic resin injected into each mold cavity by the nozzle 10 cools and sets over the remainder of the path 6.

Figure 3:
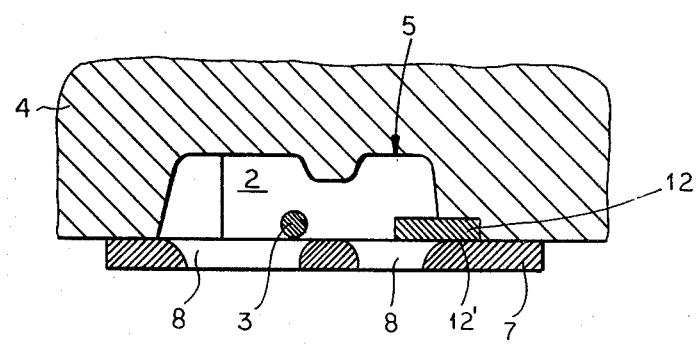
FIG. 3 is a section corresponding to FIG. 2 but illustrating another embodiment of the invention for producing coupling members of somewhat different shape.

The single-shank coupling members made in the mold cavities of FIGS. 2 and 3 are applied directly (without further shaping) to the textile web while the double-shank member of FIG. 4 must first be bent into a U-configuration before being applied.

In each case, the mold cavity within the wheel defines the outer counter of the coupling member while the forming band 7 and its openings 8 define the contours of the face of the coupling member turned toward the tape.

The textile strands 3 are always fed between the forming band 7 and the wheel 4.

In some cases it has been found to be advantageous to provide the mold cavities such that webs or strands of the synthetic resin material can bridge the coupling members as well, e.g. by ensheathing the strand between the coupling members.

Figure 5:
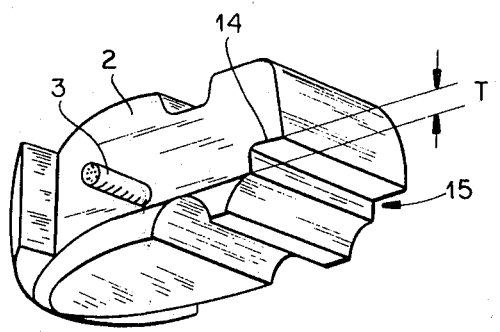
FIG. 5 is a perspective view of a single coupling member of a row thereof as made with the mold cavity of FIG. 2.
Figure 6:
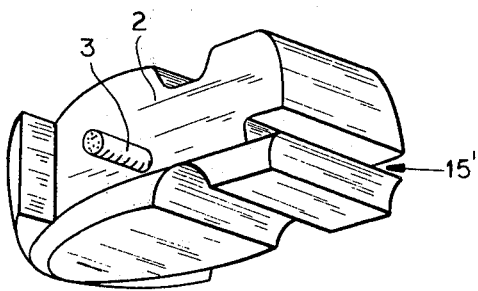
FIG. 6 is a view corresponding to FIG. 5 of a coupling member made with the device of FIG. 3.

From FIGS. 2 through 4 it will be apparent that the forming wheel 4 is provided, in addition to the mold cavities, with a continuous circumferential groove 11 which opens into the mold cavities and receives an undercutting band 12 which fits in this groove flush with the outer periphery of the wheel at 12' and projects laterally into the mold cavity to define overhangs 13 with respect to the bottom of the mold cavities and hence formed by overhanging surfaces 14. The undercuts 15 can be open at the edge (FIGS. 2 and 4) so that the grooves 15 are in the form of steps (FIGS. 5 and 7) with a depth T. They may also be in the form of grooves as shown at 15' in FIG. 6. The band 12 is composed of the same material as the band 7 and can have edge-opening formations turned toward the beds 5 to impart a complementary configuration to the undercut produced thereby. The formations 15 and 15' can be used to guide the slider. The invention also greatly increases the variety of shapes of the coupling members which can be produced.

I claim:

1. An apparatus for producing a row of coupling members for a slide-fastener stringer comprising:

a forming wheel provided on the periphery with a multiplicity of equispaced outwardly open forming beds having configurations complementary to contours of respective coupling members to be formed therein, and a circumferential outwardly open groove intersecting said beds;

an endless forming band extending around a portion of the periphery of said wheel and provided with openings respectively registering with said beds whereby said each opening and the bed in registry therewith forms a respective mold cavity;

an undercutting band received wholly in said groove and interposed between said periphery of said wheel and said forming band and projecting into said mold cavity, said forming band being of a width sufficient to span over said beds and said undercutting band on the periphery of said wheel; and means for introducing thermoplastic synthetic resin into each of said mold cavities to produce respective coupling members of complementary shape therein whereby, upon separation of said members from said wheel and said bands, said undercutting band forms an undercut portion in each coupling member.

2. The apparatus defined in claim 1, further comprising means for feeding at least one textile strand into said mold cavities beneath said bands in regions of said wheel whereby said strand is embedded in said coupling members.

3. The apparatus defined in claim 2 wherein said bands are composed of the same material.

4. The apparatus defined in claim 2 wherein said undercutting band has formations turned toward the respective beds and open at the edge thereof for imparting complementary contour to undercut portions of the coupling members.

* * * * *